Jan. 7, 1969        G. W. SCHAEFER        3,420,559

DOWEL LOCKS

Filed Sept. 29, 1966        Sheet 1 of 3

INVENTOR.
GEORGE WILLIAM SCHAEFER
BY GLADYS SCHAEFER, EXECUTRIX

BY Cox and Sheridan
ATTORNEYS

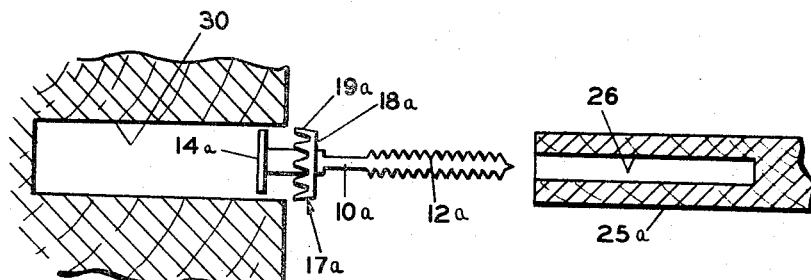
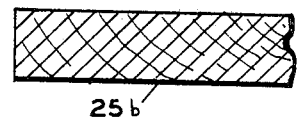
FIG. 4  FIG. 4A
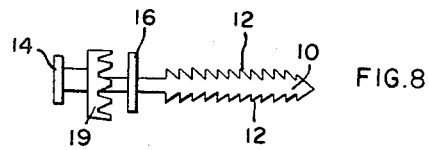
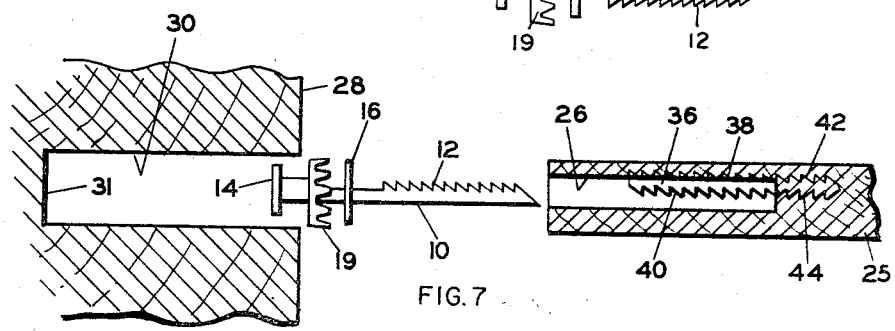
FIG. 8
FIG. 7
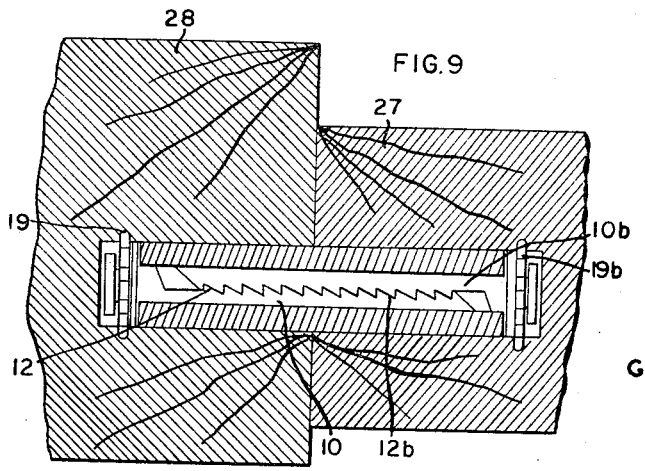
FIG. 9

Jan. 7, 1969   G. W. SCHAEFER   3,420,559
DOWEL LOCKS
Filed Sept. 29, 1966   Sheet 3 of 3

INVENTOR.
GEORGE WILLIAM SCHAEFER
BY GLADYS SCHAEFER, EXECUTRIX
BY Cox and Sheridan
ATTORNEYS

United States Patent Office 3,420,559
Patented Jan. 7, 1969

3,420,559
DOWEL LOCKS
George William Schaefer, deceased, late of Franklin County, Ohio, by Gladys Schaefer, executrix, Columbus, Ohio, assignor, by mesne assignments to William A. Schaefer, Gahanna, Ohio
Filed Sept. 29, 1966, Ser. No. 583,149
U.S. Cl. 287—127
Int. Cl. F16b *13/04;* E04b *1/48;* E04c *1/10*
26 Claims

ABSTRACT OF THE DISCLOSURE

This invention relates to improvements in a dowel lock. More particularly, the invention concerns a lock for securing a dowel in a corresponding bottomed hole in a piece of material. The lock is so constructed that two such locks may be used in connection with a relatively short dowel pin so as to fasten securely and permanently two abutting pieces of material.

BACKGROUND OF THE INVENTION

Presently, there are several methods of locking or securing a dowell in a corresponding bottomed hole in an adjoining piece of material such as wood. By "bottomed hole" I mean a hole which has a botton wall, i.e. one which does not go completely through the piece of wood.

One method of locking a dowel in its bottomed hole is to drive nails into the piece of wood in such a manner that they also enter the dowell. This method is a simple one, but is somewhat crude when quality workmanship is desired. There is another disadvantage in this method in that many times the position of the hole in a large piece of material is such that it makes impossible the use of nails for locking purposes. Also, there is some uncertainty in this method as to whether a secure lock has been achieved, because often it is difficult to tell if the nail which has been driven into the piece of wood has also entered the dowel.

Another popular method of securing a dowel in its bottomed hole is to fill the hole with a substantial amount of adhesive or glue immediately prior to positioning the dowel in the hole. The difficulty with this method is that adhesives are incapable of providing a permanent lock. Over a period of time they lose their bonding power and a slight torque applied on the dowel is sufficient to break the lock.

Another method of locking a dowel in its corresponding bottomed hole is presented by P. W. Hoshor in Patent No. 1,832,706. Hoshor's invention is a tubular dowel pin with curved prongs formed on the periphery of each tubular end, which prongs are forced outwardly into the surrounding material by means of a sloping base or expander positioned in the bottom of the hole. That invention has the unfortunate handicap of being limited to metal dowel pins, for seemingly it would be difficult to form a woden dowel with expandable prongs on an end thereof. Hoshor's device has the further disadvantages of requiring that the dowel be specially formed to include prongs and to utilizing prongs that are originally inwardly concave in relation to the hole. Prongs that were inwardly concave prior to being driven into the surrounding material are more easily removed by a pulling force on the dowel than are prongs that originally were outwardly concave.

In addition to methods and devices for locking a dowel in a hole, there are many devices which relate to the art of securing together two separte pieces of material. Most of these devices utilize some type of anchor bolt. Generally, the head of the bolt is imbedded in a bottomed hole in one piece, the threaded shank is extended into and through a hole drilled completely through the adjoining piece, and a nut is tightened on the threaded shank in order to secure the two pieces together. It is readily observable that a main disadvantage with that type of device is that a hole must be drilled through the entire structure of one of the pieces of material in order for the device to be functional. Thus, a device which utilizes an anchor bolt for fastening together two adjoining pieces of wood cannot be used when it is impossible or undesirable to drill a hole completely through one of the pieces.

C. J. Phillips' invention in Patent No. 494,745 is an example of the device which utilizes an anchor bolt. The head of the anchor bolt is held within the bottomed hole by means of an expanded washer or collar. W. B. Green's invention in Patent No. 2,527,128 presents another example. Therein the bolt head is held in place by means of a sleeve and expanded cup-shaped washer device. As in Hoshor's dowel device, Green's invention utilizes an expansion member which is inwardly concave in relation to the hole. These inventions are mentioned for the purpose of acknowledging that the art of fastening adjoining pieces of material with anchor bolts utilizing expansion members is somewhat developed. They are mentioned for the equally important purpose of presenting the fact that though these inventions present apparently useful anchoring devices, they are quite incapable of (1) securely anchoring a dowel and (2) uniting two pieces of material without the drilling of a hole completely through one of the pieces.

OBJECTS

It is, therefore, an object of this invention to overcome the aforementioned problems and disadvantages present in the prior art.

It is an object to provide a device which will securely anchor a dowel in a corresponding bottomed hole in a piece of material.

It is also an object of my invention to provide a dowel locking device which will permanently anchor a dowel in a hole and will not fail when the dowel is subjected to torque or tension.

It is another object to provide a device for anchoring a dowel in a corresponding bottomed hole which is completely hidden from view when operative and which does not require a specially constructed dowel.

It is a further object to provide a device which is capable of permanently uniting two adjoining pieces of material, such as wood, in such a manner that the device is completely hidden from view when operative and is functional without the drilling of a hole through the entirety of either one of the pieces.

Further object and features of my invention will be apparent from the following specification and claims when considered in connection with the accompanying drawings illustrating several embodiments of my invention.

DRAWINGS

In the drawings:

FIG. 4 is a sectional view in elevation of a modification of the preferred embodiment of my invention, as presented in FIGS. 1 and 2;

FIG. 4a is a sectional view in elevation of an alternative embodiment of a dowel for use with my dowel lock;

FIG. 7 is a sectional view in elevation of another modification of my invention;

FIG. 8 is a view in elevation of an alternative embodiment of my invention; and

FIG. 9 is a view in section of an alternative embodiment of my invention.

Figure 1:
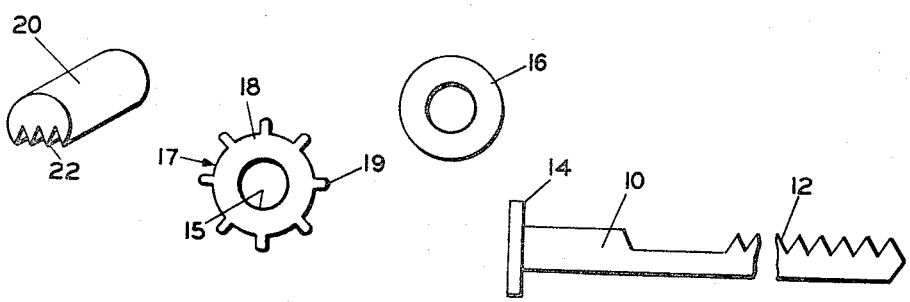
FIG. 1 is a view in elevation of three of the various parts of my invention and a perspective view of one of the parts of my invention.
Figure 2:
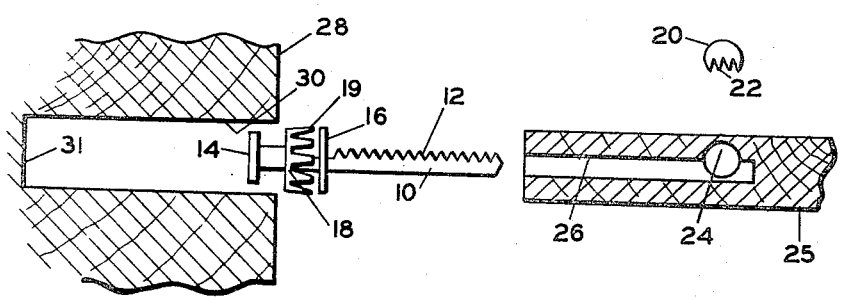
FIG. 2 is a sectional view in elevation of a dowel and the preferred embodiment of my dowel lock immediately prior to positioning of the lock and insertion of the dowel into the corresponding hole.
Figure 3:
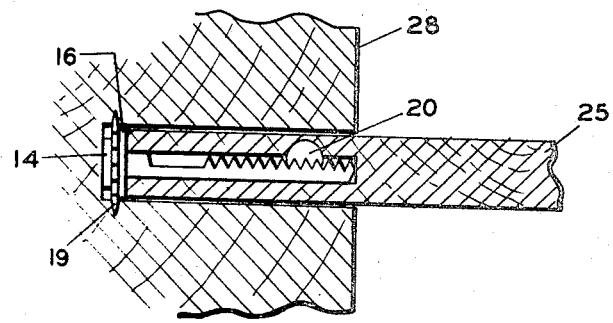
FIG. 3 is a sectional view in elevation of the same dowel and dowel lock as shown in FIG. 2, but with the lock positioned and the dowel inserted into the bottomed hole.

Turning now to the specific embodiments of my invention selected for illustration in the drawings, it can be seen that the various parts of my dowel lock invention are: (1) a nail 10 having a flat head 14 formed on the end of a shank with transverse serrations 12, (2) a washer 16 whose internal diameter is larger than the outer diameter of the serrated shank of nail 10 but smaller than the diameter of the flat head 14, (3) a petalled washer 17 having a flat washer body 18 with a center hole 15 and peripheral outwardly extending petals 19, and (4) a locking pin 20 having longitudinal serrations 22 formed on a side thereof. FIGS. 1 and 3 show the petalled washer 17 in its anchoring or flattened form; FIG. 2 shows the petalled washer 17 in its original or concave form. The petals 19 of the concave washer 17 form an acute angle with the plane of the flat body 18. Although as shown, this angle may approach a 90° angle, it cannot be a 90° angle.

FIGS. 2 and 3 show the entire assembly of my invention which includes in addition to the parts of the dowel lock described above a piece of material 28, preferably wood, and a dowel 25. The piece of material 28 is formed with a hole 30, corresponding to the dowel 25 and provided with a bottom 31. The dowel 25 is formed with a longitudinal hole 26 which is adapted to receive the shank of nail 10 and with a transverse hole 24 which is adapted to receive the locking pin 20. As shown in FIG. 2, it is preferred that the transverse hole 24 be drilled completely through the dowel 25, although it is not a necessary requirement as it may be drilled for example from one side only.

A modified form of my invention is shown in FIG. 4. The washer 16 is dispensed with as shown when the size of the nail head 14a is increased sufficiently so as to be capable of retaining petalled washer 17a on the nail 10a and of serving as an anvil to help flatten the petalled washer 17a between itself and the end of the dowel.

The concave washer 17a is reversed so that in its original position it is inwardly concave in relation to the hole 30 rather than outwardly concave as was shown in the preferred embodiment of FIG. 2. This modification makes for a weaker lock when the assembly is subjected to excessively strong forces. However, it does provide a reliable lock that will withstand ordinary strong forces and torque.

The nail 10a may be formed with transverse serrations 12a which encircle the shank. Also, the nail may be formed with transverse serrations along two, three, or four sides, none of which modifications are shown.

The dowel 25 may be modified so that the drilling of the transverse hole 24 is eliminated. The dowel would then resemble that shown as 25a. No cooperating retaining member, such as locking pin 20, is used with the dowel 25a. It is the gripping of wall of hole 26 by transverse serrations 12a that alone retains the nail 10a within the longitudinal hole 26.

The dowel 25 may be further modified so that the drilling of both the transverse hole 24 and the longitudinal hole 26 is eliminated. This structure is an ordinary dowel shown in FIG. 4a as the dowel 25b. When dowel 25b is used the nail 10a is driven into the end of the dowel 25b and is retained therein by the gripping action of the transverse serrations 10a.

Another modification of my invention is shown in FIG. 7. A stud 36 is used as the cooperating retaining member to secure the nail 10 within the longitudinal hole 26. The stud 36 is formed with transverse serrations on two opposite sides, serrations 38 and 42 being on one side and serrations 40 and 44 being on the other side. Serrations 42 and 44 are embedded in the bottom of longitudinal hole 26 and are formed so as to oppose the withdrawal of the stud 36 from the dowel 25. Serrations 38 grip the wall of the hole 26 and further oppose the withdrawal of the stud 36. Serrations 40 are formed so as to interlock with the serrations 12, thereby securing the nail 10 within the dowel 25. A further modification is shown in FIG. 8 and is achieved where nail 10 is formed with transverse serrations along its shank which are opposite the serrations 12. These further serrations would grip the wall of hole 26 similar to the gripping of serrations 38, and consequently would further secure the nail 10 within the dowel 25.

Figure 5:
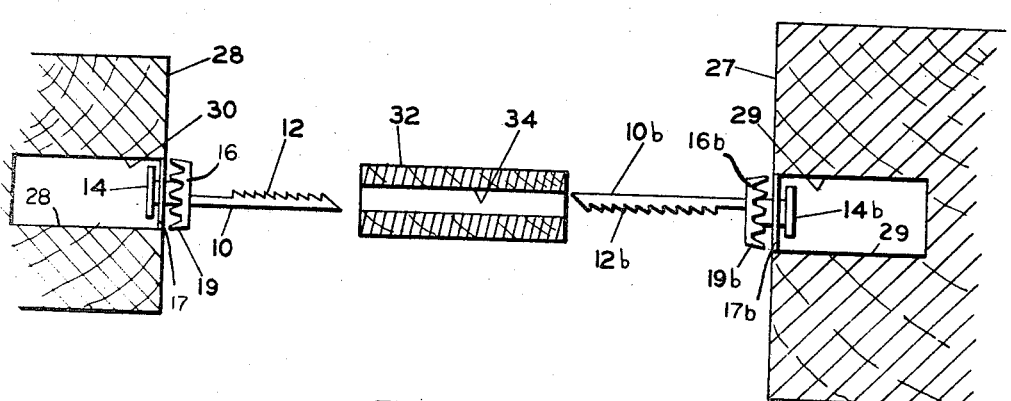
FIG. 5 is a sectional view in elevation of two similar embodiments of my invention immediately prior to their being simultaneously locked together within a short dowel pin and inserted into their corresponding bottomed holes, thereby permanently joining together the two pieces of wood.
Figure 6:
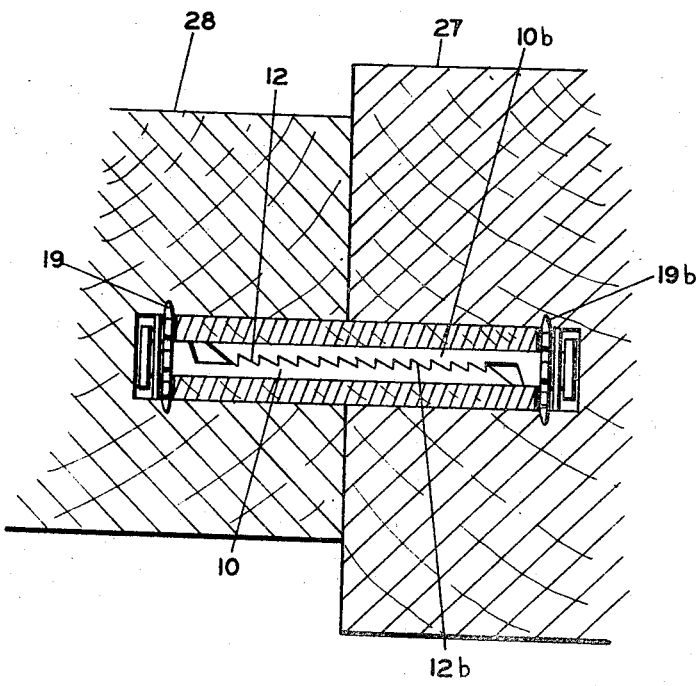
FIG. 6 is a sectional view in elevation of the same embodiments in FIG. 5, but with the embodiments anchored and locked together, thereby permanently joining two abutting pieces of wood.

In FIGS. 5 and 6 a short dowel pin 32 with a longitudinal hole 34 through its length is used with two of my aforementioned dowel locking devices in order to unite permanently two abutting bodies or pieces of wood. The hole 34 is adapted to receive the shank of nail 10 and the shank of nail 10b together as shown in FIG. 6.

A hole 29 in lumber piece 27 is arranged to receive the head 14b of nail 10b, a portion of the shank 12b thereof and two washers 16b and 17b associated with the head end of nail 10b. Similarly, a hole 20 in lumber piece 28 is arranged to receive the head 14 of nail 10, a portion of the shank 12 thereof, and two washers 16 and 17 associated with the head end of nail 10. It is of course understood that washers 17 and 17b are petalled washers and washers 16 and 16b are plain washers adapted to spread the petals 19 and 19b or to back up the petalled washers 17 and 17b against contact with the ends of the dowel 32.

FIG. 9 shows a similar assembly with the plain washers 16 and 16b, however, between the petalled washers 17 and 17b and the dowel 25.

OPERATION

In operation, the first or concave petalled washer 17 is slipped over the shank and serrations 12 of the nail 10 so that it is near the head 14. The second washer 16 is then positioned on the nail 10 in the same manner. It is preferred that the washer 17 with its radially slit outer portions or petals 19 be outwardly concave in relation to the bottomed hole 30. However, it may also be positioned so that it is inwardly concave in relation to the hole 30. When the washer 17 is positioned so that it is inwardly concave, the second washer 16 is placed on the shank of the nail prior to the first washer 17. Thus, the second washer 16 is preferably positioned adjacent the concave side of the concave washer 17.

With the washer 16 and the concave washer 17 thus engaged on the shank of nail 10, the point of the nail 10 is partially inserted into the longitudinal hole 26 in the dowel 25. Locking pin 20 is then inserted into its transverse hole 24 in the dowel 25 so that its serrations 22 extend partially into the hole 26. It should be noted that the length of pin 20 is approximately the length of its corresponding hole 24. This is for the reason that it is essential that the pin 20 be carried by the dowel 25 to a position inward in the hole 30 from the outer surface of the piece of wood 28, as shown in FIG. 3. The wall of hole 30 then prevents the locking pin 20 from sliding out of the hole 24.

After locking pin 20 is inserted in its hole 24 and with the point of the nail 10 still partially inserted in the hole 26, the head 14 of the nail 10 is inserted into the hole 30 in the piece of wood 28. Next, the dowel 25 is driven as far as possible into the hole 30, thus forcing the nail 10 deeply into the hole 26. This driving force causes almost simultaneously (1) the petals 19 on concave washer 17 to flatten and embed themselves in the surrounding material 28 near the bottom 31 of the hole 30 and (2) the serrations 12 of the nail 10 to lock with the serrations 22 of the locking pin 20. The assembly in this final locked position is shown in FIG. 3, wherein the head 14, the petalled washer 17 with expanded petals 19, the washer 16 and the end of the dowel 25, are juxtaposed at the bottom 31 of hole 30.

Once the dowel lock shown in FIGS. 2 and 3, and described above, has been assembled, positioned, and installed, the installation is permanent. The nail 10 cannot be separated from the dowel 25 because of the lock between serrations 12 and serrations 22. The nail 10 cannot be removed from the hole 30 because of the anchoring action created by the embedded petals 19 on the petalled washer 17. In the prior art many times the dowel lock could be broken by a twisting of the dowel, followed by a strong pulling force which would remove the dowel from its hole. This is not possible with my dowel lock. A torque or twisting force applied to the dowel 25 will not break the lock or make it ineffective. If the twisting force is strong enough it will cause the nail 10, its head 14, and the locking pin 20 to rotate with the dowel 25. However, the petalled washer 17 remains embedded and does not turn, and the lock between the serrations 12 and 22 is still maintained. Locking pin 22 remains in contact with the nail 10 at all times during any twisting of the dowel 25 because the wall of the hole 30 prevents the pin 22 from slipping out of its own hole 24. Hence, my dowel lock presents a needed improvement in the art because it is capable of effecting a permanent lock which cannot be broken by a torque or pulling force applied on the dowel.

The unique structure of my dowel lock is such that two of them may be used in connection with a short dowel pin in order to fasten permanently two abutting pieces of material or wood. FIGS. 5 and 6 present views of how the permanent uniting is accomplished. Two of my locking devices are placed in such a manner that the points of the serrations 12b of the nail 10b are displaced 180° from the points of the serrations 12 of the nail 10.

The assembly process of the two dowel locks with the dowel pin 34 and the corresponding holes 29 and 30 is similar to the assembly process herein described for the single dowel lock and dowel. That is, the points of the nails 10 and 10b are inserted partially into opposite ends of the hole 34 in the dowel pin 32, so that the shank of each nail points toward the other nail's head, and the nail heads 14 and 14b are started into their respective holes 30 and 29. The two pieces of lumber 27 and 28 are then brought together and the resulting structure is shown in FIG. 6. The lock provided is a permanent one since the petals 19 and 19b firmly anchor their associated nails in the holes 30 and 29 and since the serrations 12 and 12b are securely interlocked within hole 34 of the dowel pin 32. Thus, a twisting or pulling force applied on either piece of wood, 27 or 28, will not cause the lock to become ineffective.

FIG. 7 shows another useful form of my invention wherein a locking action similar to that shown in FIGS. 5 and 6 is used, but here the action is used in connection with the locking of a dowel 25. The retaining of nail 10 within the dowel 25 is achieved by interlocking the serrations 12 of the nail 10 with the serrations 40 on serrated stud 36. After the stud 36 has been embedded in the dowel 25, as shown, by means of a hammer and punch, the point of the nail 10 is inserted into the hole 26 and the head 14 is inserted into hole 30. The dowel 25 is then driven into the hole 30. These actions are sufficient to cause the anchoring of the petals 19 in surrounding wood 28 near the bottom 31 of the hole 30 and the interlocking of serrations 12 with the serrations 40. This makes for a durable lock that will withstand large forces on the assembly.

It is to be understood that while the detailed drawings and specific examples given describe preferred embodiments of my invention, they are for the purposes of illustration only, that the apparatus of the invention is not limited to the precise details and conditions disclosed, and that various changes may be made therein without departing from the spirit of the invention which is defined by the following claims.

What is claimed is:
1. An assembly which comprises:
 (1) a body provided with a bottomed hole;
 (2) a dowel, an end portion of which is snugly fitted within said bottomed hole;
 (3) a nail which includes a head and a shank, said head being formed on an end of said shank and being juxtaposed with the end of said dowel at the bottom of said hole, and said shank being formed with transverse serrations along a portion of its length and being fitted longitudinally within said dowel;
 (4) a petalled washer through which said shank extends, said washer being formed with peripheral outwardly extending petals and being positioned between said head and said dowel end, said petals being embedded in said body; and
 (5) means comprising the serrations along a portion of said shank for securing said nail firmly in said dowel;
 whereby said nail is firmly secured to said body by said petals and said dowel is secured in said bottomed hole by means of said nail.

2. The assembly according to claim 1 wherein said body and said dowel are wood.

3. The assembly according to claim 1 wherein said assembly, in addition, comprises a second washer through which said shank extends, said second washer being positioned between said head and said petalled washer.

4. The assembly according to claim 1 wherein said assembly, in addition, comprises a second washer through which said shank extends, said second washer being positioned between said petalled washer and the end of said dowel.

5. The assembly according to claim 1 wherein said dowel has a longitudinal hole in said end, said longitudinal hole being adapted to receive said shank.

6. The assembly according to claim 5 wherein said assembly, in addition, comprises a cooperating retaining member fixed in said dowel and adapted to engage a portion of said transverse serrations along said shank.

7. The assembly according to claim 6 wherein said cooperating retaining member is a locking pin with longitudinal serrations formed on at least one side thereof, said locking pin being positioned in a transverse hole through said dowel,
 whereby, said longitudinal serrations on said locking pin engage a portion of said transverse serrations along said shank to secure said nail to said dowel.

8. The assembly according to claim 7 wherein said locking pin is restrained within said transverse hole by the wall of said bottomed hole.

9. The assembly according to claim 6 wherein said cooperating retaining member is a stud with transverse serrations formed along its length, said stud being partially embedded in the bottom of said longitudinal hole.
 whereby, said transverse serrations along said stud engage the transverse serrations along said shank to secure said nail to said dowel.

10. The assembly according to claim 9 whereby said transverse serrations along said stud and said transverse serrations along said shank also grip the wall of said longitudinal hole to secure further said nail to said dowel.

11. The assembly according to claim 1 wherein said transverse serrations encircle said shank.

12. The assembly according to claim 1 wherein said transverse serrations are formed on one side of said shank.

13. The assembly according to claim 1 wherein said transverse serrations are formed on two opposite sides of said shank.

14. A dowel lock for securing a dowel within a corresponding bottomed hole in a piece of material, said dowel lock comprising
(1) a nail which includes a head and a shank, said head being formed on one end of said shank and said shank being formed with transverse serrations along a portion of its length;
(2) a concave washer through which said shank extends; and
(3) a cooperating retaining member positioned within said dowel and adapted to engage a portion of said transverse serrations along said shank;
whereby, when said hea dis positioned in said bottomed hole and an end portion of said dowel is driven into said bottomed hole, then said shank enters into said dowel and locks with said retaining member, and said concave washer flattens between said head and the end of said dowel and embeds its outer portions within said material.

15. The dowel lock according to claim 14 in which the concave washer has a substantially flat body which is formed with outwardly extending peripheral petals each of which petals forms an acute angle with the plane of said body,
whereby, when said concave washer flattens it embeds its petals within said material.

16. The dowel lock according to claim 14 in which the outer portions of said concave washer are slit radially,
whereby when said concave washer flattens it embeds at least a part of the outer portions within said material.

17. The dowel lock according to claim 14 wherein, when said head is positioned in said bottomed hole, said washer is outwardly concave in relation to said bottomed hole.

18. The dowel lock according to claim 14 wherein, when said head is positioned in said bottomed hole, said washer is inwardly concave in relation to said bottomed hole.

19. The dowel lock according to claim 14 wherein said dowel lock, in addition, comprises a second washer through which said shank extends, said second washer being positioned adjacent the concave side of said concave washer.

20. The dowel lock according to claim 14 wherein said dowel has a longitudinal hole in said end, said longitudinal hole being adapted to receive said shank.

21. The dowel lock according to claim 20 wherein said cooperating retaining member is a locking pin with longitudinal serrations formed on at least one side thereof, said locking pin being positioned in a transverse hole through said dowel,
whereby said longitudinal serrations on said locking pin engage a portion of said transverse serrations along said shank to secure said nail to said dowel.

22. The dowel lock according to claim 14 wherein said dowel has a longitudinal hole through its length adapted to receive said shank, and wherein said cooperating retaining member is a second nail formed with a head and transverse serrations along a portion of its shank, the head of said second nail being outside said dowel and juxtaposed with the other end portion of said dowel.

23. An assembly which comprises
(1) two abutting bodies, each body provided with a bottomed hole which is facing and adjacent the other bottomed hole;
(2) a dowel pin formed with a longitudinal hole through its length, the opposite end portions of which dowel pin are each respectively snugly fitted within one of said two bottomed holes;
(3) two nails, each of which includes a head and a shank, each head being formed on the end of a shank and being juxtaposed with one end of said dowel pin at the bottom of one of said bottomed holes, and each shank being positioned within said longitudinal hole partially adjacent the other shank so that it points toward the head of the other nail and being formed with transverse serrations along a portion of its length, said transverse serrations on each shank being interlocked with the transverse serrations along the other shank, the shanks having total lateral dimensions when interlocked substantially the same as the lateral dimensions of the longitudinal hole so that the shanks may be snugly fit into the hole and yet be maintained interlocked by the walls thereof; and
(4) two petalled washers, with one of said shanks extending through each, each washer being formed with peripheral outwardly extending petals and being positioned between one of said heads and one end of said dowel pin, said petals being embedded in their respective surrounding body;
whereby, said nails are firmly secured to their respective bodies by means of said petals and said nails are firmly secured to one another within said dowel pin by means of said interlocked serrations.

24. The assembly according to claim 23 wherein said bodies and said dowel pin are wood.

25. The assembly according to claim 23 wherein said assembly further comprises two additional washers, with one of said shanks extending through each, each additional washer being positioned between one of said heads and one of said petalled washers.

26. The assembly according to claim 23 wherein said assembly further comprises two additional washers, with one of said shanks extending through each, each additional washer being positioned between one of said petalled washers and one end of said dowel pin.

References Cited

UNITED STATES PATENTS 2,005,895    6/1935    Hengstenberg    151—41.74

FOREIGN PATENTS 1,335,853    7/1963    France.

CARL W. TOMLIN, *Primary Examiner.*

W. L. SHEDD, *Assistant Examiner.*

U.S. Cl. X.R.

52—585; 85—4, 7; 151—41.73, 41.74; 287—20.92